United States Patent [19]

Matsukawa et al.

[11] Patent Number: 4,579,424
[45] Date of Patent: Apr. 1, 1986

[54] LIQUID CRYSTAL DISPLAY DEVICE HAVING INTERDIGITATED COMMON ELECTRODES AND COLOR FILTERS

[75] Inventors: Fumio Matsukawa; Hirotsugu Arai, both of Hyogo, Japan

[73] Assignee: Mitsubishi Denki Kabushiki Kaisha, Tokyo, Japan

[21] Appl. No.: 574,218

[22] Filed: Jan. 26, 1984

[30] Foreign Application Priority Data

Jan. 26, 1983 [JP] Japan .................. 58-12480

[51] Int. Cl.⁴ ........................................... G02F 1/13
[52] U.S. Cl. .......................... 350/336; 350/339 F
[58] Field of Search .................... 350/336, 339 F

[56] References Cited

U.S. PATENT DOCUMENTS 4,410,887 10/1983 Stolov et al. .............. 350/339 F X

FOREIGN PATENT DOCUMENTS 57-165819 10/1982 Japan .................. 350/336
2024443A 1/1980 United Kingdom ......... 350/339 F

*Primary Examiner*—John K. Corbin
*Assistant Examiner*—Richard F. Gallivan
*Attorney, Agent, or Firm*—Sughrue, Mion, Zinn, Macpeak, and Seas

[57] ABSTRACT

A liquid crystal display device for displaying numerals in segments and in color including N common electrode divisions having interdigital configurations and striped transparent colored wires of N colors formed on the common electrode divisions in conformity therewith, with each segment containing display color elements of N+1 colors or more. The striped transparent colored layers are successively arranged in repetitive patterns, and may consist of two or more colors. The pitch of the striped transparent colored wires should provide a viewing angle within 2 minutes.

3 Claims, 7 Drawing Figures

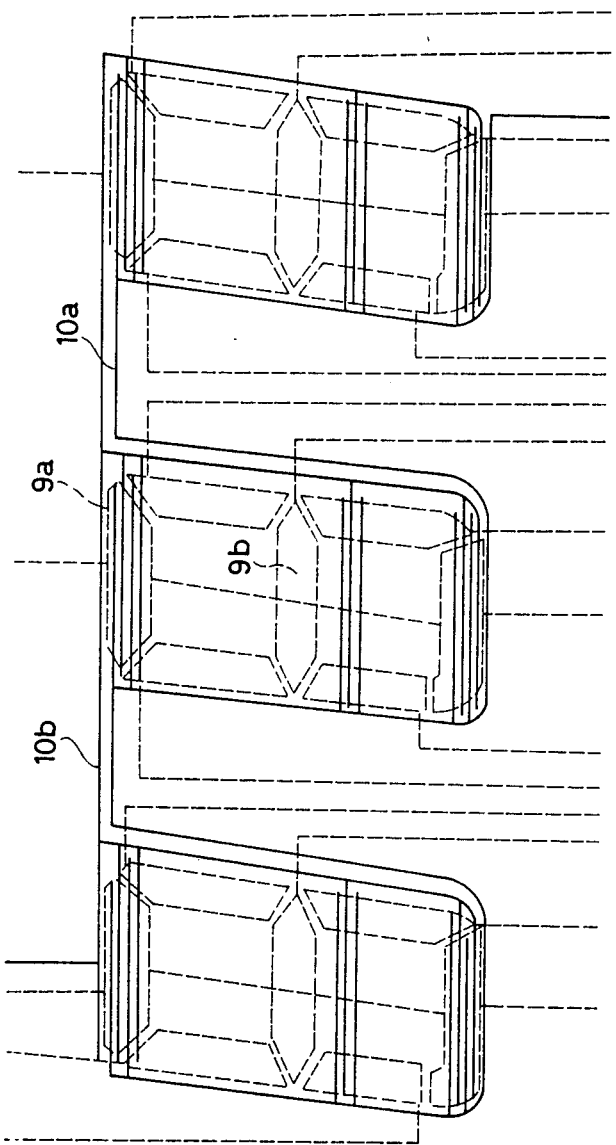

LIQUID CRYSTAL DISPLAY DEVICE HAVING INTERDIGITATED COMMON ELECTRODES AND COLOR FILTERS

BACKGROUND OF THE INVENTION

The present invention relates to a segment-type numeric liquid crystal display (hereinafter referred to as an "LCD") device capable of switching between two or more display colors.

Prior numeric LCD devices capable of displaying two or more display colors include dot-matrix font displays. FIGS. 1A and 1B are fragmentary front elevational and cross-sectional views, respectively, of such a dot-matrix LCD device. As shown in FIGS. 1A and 1B, the dot-matrix LCD device includes confronting transparent substrates 1a, 1b, a plurality of elongated transparent electrodes 2a, 2b, . . . , (generally referred to as "2"; only numerals out of similar combinations of numerals and alphabetic suffixes will similarly be used below); a plurality of transparent electrodes 3a, 3b, . . . made, for example, of indium oxide formed on inner surfaces of the transparent substrates 1a, 1b; a liquid crystal layer 4 sandwiched between the transparent substrates 1a, 1b; and a seal 5 made of epoxy resin including a spacer (not shown) made of alumina powder for maintaining the thickness of the liquid crystal layer 4 in a range of 1 to 100 µm.

The elongated transparent electrodes 2, 3 are disposed in mutually crossing relation with the liquid crystal layer 4 interposed therebetween. Lead electrodes 6a, 6b, . . . are formed on the transparent substrate 1a and serve as lead lines for the elongated transparent electrodes 2. Lead electrodes 7a, 7b, . . . are formed on the transparent substrate 1b and serve as lead lines for the elongated transparent electrodes 3.

Striped transparent color layers 8a, 8b are formed on the elongated transparent electrodes 3, the layers 8a, 8b being colored alternately in red, green, red, green, . . . , for example. The LCD device is denoted in its entirety by 100.

A twisted nematic liquid crystal display layer having a positive dielectric anisotropy is employed as the liquid crystal layer 4, and the LCD device 100 is sandwiched between two polarizers so that it appears in a normally dark state. The assembly is illuminated with a light source such as a fluorescent lamp (not shown) which is located behind the LCD device and which emits light including components of red and green. A prescribed voltage is applied to the liquid crystal layer 4 through the crossing electrodes 2, 3 via the external lead electrodes 6, 7.

When the voltage is applied, crossing portions (hereinafter referred to as "rectangular patterns") of the electrodes 2, 3 are rendered transmissive. Therefore, when the LCD device is viewed from the side opposite the fluorescent lamp, the colored layers corresponding to the red rectangular patterns appear red, while the colored layers corresponding to the green rectangular patterns appear green.

Multicolor numeric display is effected, for example, by a five-by-seven matrix of dots, each composed of a pair of rectangular patterns having red and green colored layers. For displaying a numeral in red, five-by-seven rectangular patterns having red colored layers are used, and for displaying a numeral in green, five-by-seven rectangular patterns having green colored layers are used. When displaying a numeral in mixed red and green colors, both of the five-by-seven rectangular patterns are used.

Voltages are applied to the lead electrodes 6, 7 which will cause the rectangular patterns to light (be rendered transparent) in conformity with a desired numeral to be displayed.

It is usual to drive the dot-matrix LCD device by multiplexing using seven or more scanning lines employing a voltage averaging process.

The multicolor numeric display using a conventional dot-matrix LCD device as described above has however suffered from the following disadvantagaes:

(i) The number of lead electrodes required for displaying any numeral in one digit is large (7+5×2), and ten more lead wires are necessary for each additional numeric position to be displayed, resulting in complex connections to driver circuits.

(ii) The device is required to be driven by multiplexing of a relatively high order, and an operational margin is narrow, resulting in a poorer display performance than can be obtained with a segment-type LCD device.

SUMMARY OF THE INVENTION

The present invention has been made in an effort to eliminate the foregoing drawbacks.

More particularly, the present invention provides a liquid crystal display device having a segment-type LCD common electrode divided into a plurality of interdigital electrodes and striped transparent colored layers formed on respective segment electrodes, common electrodes or both, so that the number of external LCD lead wires is held to a minimum and the device can be driven through multiplexing of a low order with a wide operational margin, thereby providing clear multicolor numeric display without lowering the display performance.

BRIEF DESCRIPTION OF THE DRAWINGS

FIGS. 4 and 5 are schematic views of common electrodes, segment electrodes, and wiring arrangements of liquid crystal display devices according to other embodiments of the present invention.

DESCRIPTION OF THE PREFERRED EMBODIMENTS

A liquid crystal display device constructed according to a preferred embodiment of the present invention will be described with reference to the drawings. Specifically, FIGS. 2A and 2B are fragmentary perspective and cross-sectional views illustrative of the construction of an LCD device according to the present invention.

Figure 1A:
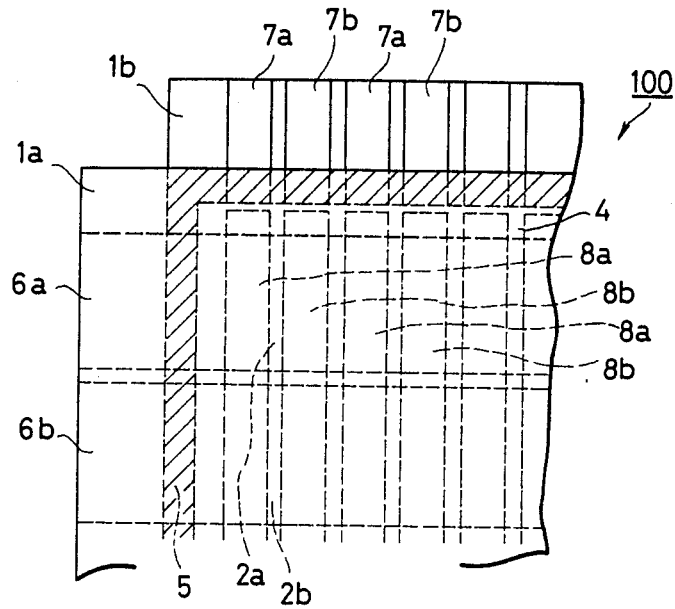
FIG. 1A is a front elevational view showing the construction of a conventional dot-matrix multicolor liquid crystal display device.
Figure 1B:
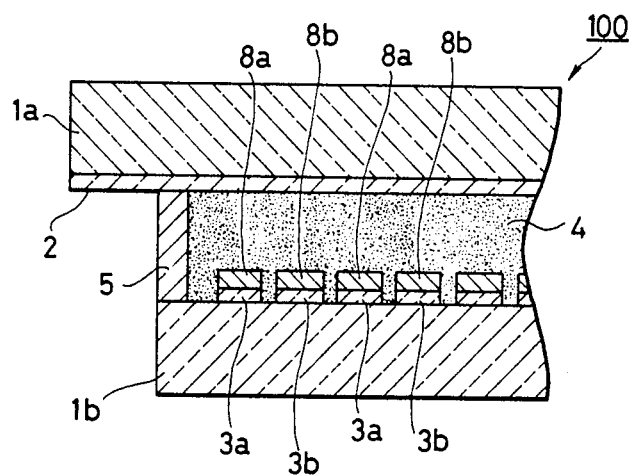
FIG. 1B is a cross-sectional view of the liquid crystal display device shown in FIG. 1A.
Figure 2A:
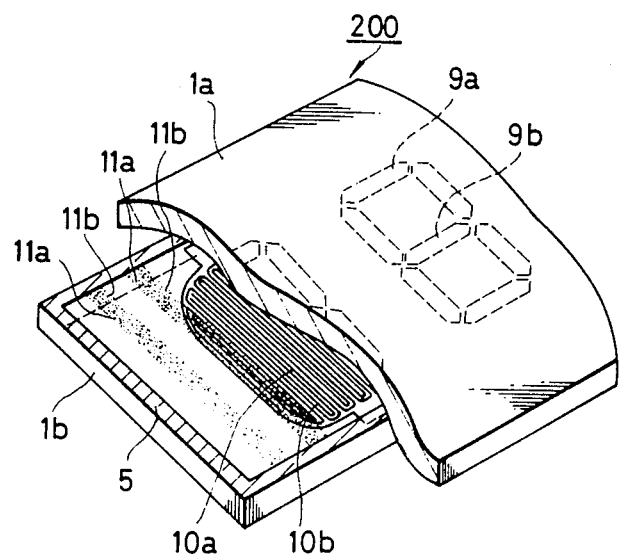
FIG. 2A is a perspective view of a liquid crystal display device according to one embodiment of the present invention.
Figure 2B:
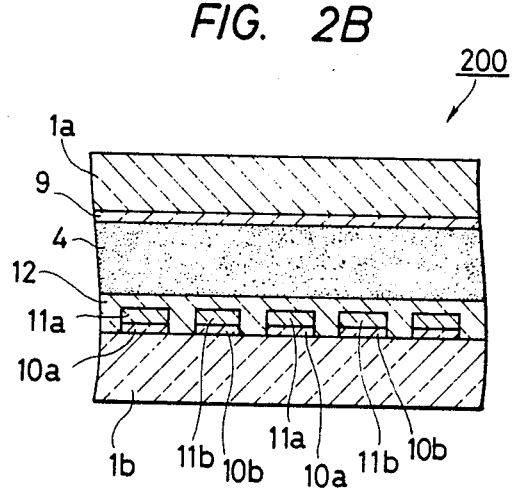
FIG. 2B is a cross-sectional view of the liquid crystal display device shown in FIG. 2A.

As shown in FIGS. 2A and 2B, the LCD device includes confronting transparent substrates 1a, 1b, and segment electrodes 9a, 9b, . . . formed on an inner surface of the transparent substrate 1a, the segment electrodes for one numeric digit being coupled to seven external lead electrodes (not shown).

The LCD device also includes two interdigital common electrodes 10a, 10b formed on an inner surface of the substrate 1b and coupled to two external lead electrodes (not shown). The segment electrodes 9 and the common electrodes 10 may be transparent electrodes of indium oxide, for example. Striped transparent colored layers 11a, 11b, . . . are shaped in conformity with the interdigital structure of the common electrodes 10. For example, the striped transparent colored layer 11a may be red-colored layers on the common electrodes 10a, and the striped transparent colored layers 11b green-colored layers on the common electrode 10b.

Designated at 4 is a liquid crystal layer and at 5 a seal. A liquid crystal cell employed in the LCD device of the present invention is denoted in its entirety by 200.

The striped transparent colored layers may be deposited by depositing transparent coatings using a screen printing process or an evaporation process. An insulator layer 12, which serves to keep the liquid crystal layer 4 and the colored layers 11 in a spaced-apart relationship, may be formed of polyimide resin or silicon dioxide, for example, with the portions of the insulator layer over the colored layers 11 having a thickness in a range of 100 to 5,000 Å. The insulator layer 12 is provided to prevent degradation of the LCD cell 200 which would otherwise be occasioned by reaction between the liquid crystal and the material of the transparent coating or dissolution of that material into the liquid crystal material.

A twisted nematic liquid crystal display layer having a positive dielectric anisotropy is employed as the liquid crystal layer 4, and the LCD cell 100 is sandwiched between two polarizers so that it appears normally dark. The assembly is illuminated with a light source such as a fluorescent lamp (not shown) which is located behind the LCD cell and emits light including components of red and green. A prescribed voltage is applied to the liquid crystal layer 4 between the segment and common electrodes 9, 10 via lead electrodes (not illustrated).

When this voltage is applied, the configurations (hereinafter referred to as "segment patterns") of the segment electrodes 9 are lighted (rendered transmissive). Therefore, when the LCD cell is viewed from the side opposite the fluorescent lamp, the segment patterns appear red when the common electrode 10a is selected, the segment patterns appear green when the common electrode 10b is selected, and the segment patterns appear as a mixture of red and green when the common electrodes 10a, 10b are both selected. Therefore, any desired numeral can be displayed in multicolor by lighting selected segment patterns.

Figure 3:
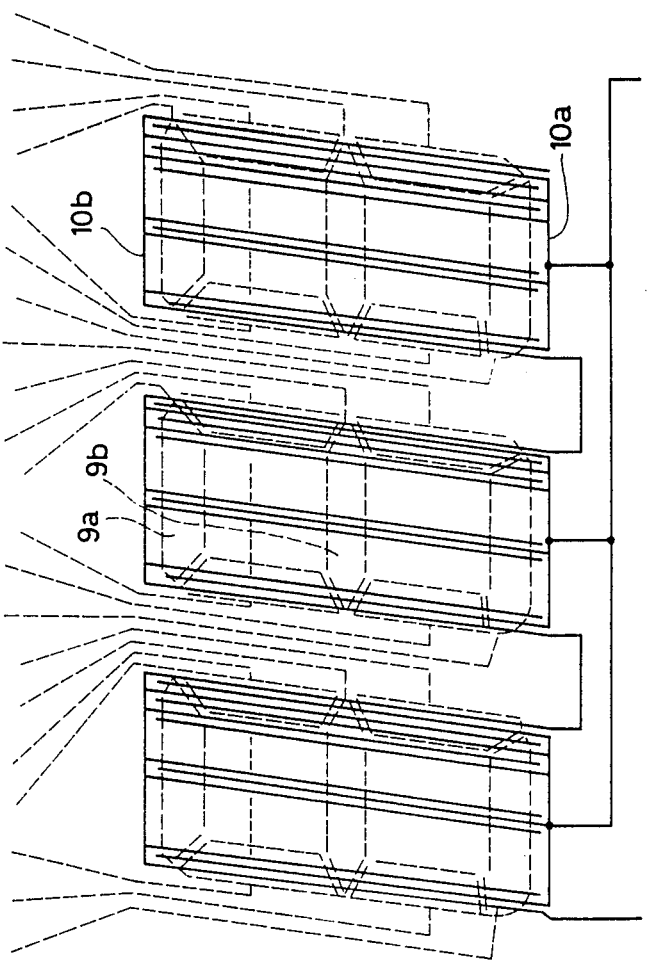
FIG. 3 is a schematic view of common electrodes, segment electrodes, and a wiring arrangement providing connection to lead electrodes of a liquid crystal display device according to another embodiment of the present invention.

FIG. 3 schematically shows common electrodes, segment electrodes, and a wiring arrangement providing connection to lead electrodes in an LCD device capable of displaying numerals in three positions selectively in three colors. For clarity, the two interdigital common electrodes 10a, 10b and their wiring arrangements are shown by solid lines, while the segment electrodes 9 are shown as enclosed by the dotted lines with their wiring arrangement shown by dotted lines. The interdigital structure of the common electrodes 10a, 10b is partly omitted from the illustration.

The LCD device may be driven by $\frac{1}{2}$-bias, $\frac{1}{2}$-duty multiplexing with the two common electrodes 10a, 10b serving as scanning electrodes, irrespective of the number of numeral digits to be displayed.

The $\frac{1}{2}$-bias, $\frac{1}{2}$-duty driving is a multiplexing driving mode of the lowest order and has a wider operational margin and is capable of displaying clearer multicolor numerals than conventional dot-matrix LCD devices. The number of external lead electrodes is only 9 ($=2+7$) for displaying a numeral in one digit and is increased by 7 for each additional numeral digit. For the three-digit display as illustrated in FIG. 3, the number of external lead electrodes required is 23 ($=2+7\times3$), with the consequence that the connections to the driver circuits are rendered simpler than with prior arrangements.

It is preferable that the interdigital configurations of the common electrodes 10a, 10b have a pitch sufficiently smaller than the width of the segment patterns. If the pitch is too large, the lighted segment patterns would appear discontinuous and hence unnatural. Also, red and green would not be sufficiently mixed together in the color mixture display mode, resulting in an unnatural appearance.

As an example, when one numeral having a height of 25 mm and a width of 15 mm is to be displayed with seven segments having a width of 3 mm, the interdigital shapes of the common electrodes 10a, 10b, should have a pitch of 300 $\mu$m, the electrodes 10a, 10b has a width of 200 $\mu$m and an interval between the electrodes is 50 $\mu$m. With this arrangement, the shape and color of the displayed numeral will not appear unnatural when viewed from behind at a distance of about 1 m.

It is necessary that the striped colored layers 11 have a pitch equal to that of the interdigital spacings of the common electrodes 10a, 10b, and be kept within a viewing angle of 2 minutes for maintaining a practically acceptable display quality.

It is preferable that the colored layers 11 have a width equal to or greater than that of the interdigital spacings of the common electrodes 10a, 10b, unless the colored layers 11 overlap each other.

While the liquid crystal layer 4 of the LCD cell 200 has been described as being a twisted-nematic liquid crystal layer, the LCD cell of the invention may be a guest-host type liquid crystal with good results using only one polarizer.

In the embodiment shown in FIGS. 2 and 3, the interdigital configurations of the common electrodes 10a, 10b and the direction in which the striped colored layers 11 extend are substantially vertical, although they are slightly tilted in conformity with the inclination of numerals to be displayed. Accordingly, when any displayed numerals is viewed from an angle other than head on, the pitches of the interdigital shapes of the common electrodes 10a, 10b and of the colored layers 11 appear narrower and the display contrast becomes higher. To avoid this problem, the interdigital configurations of the common electrodes 10a, 10b should be arranged horizontally.

Figure 4:
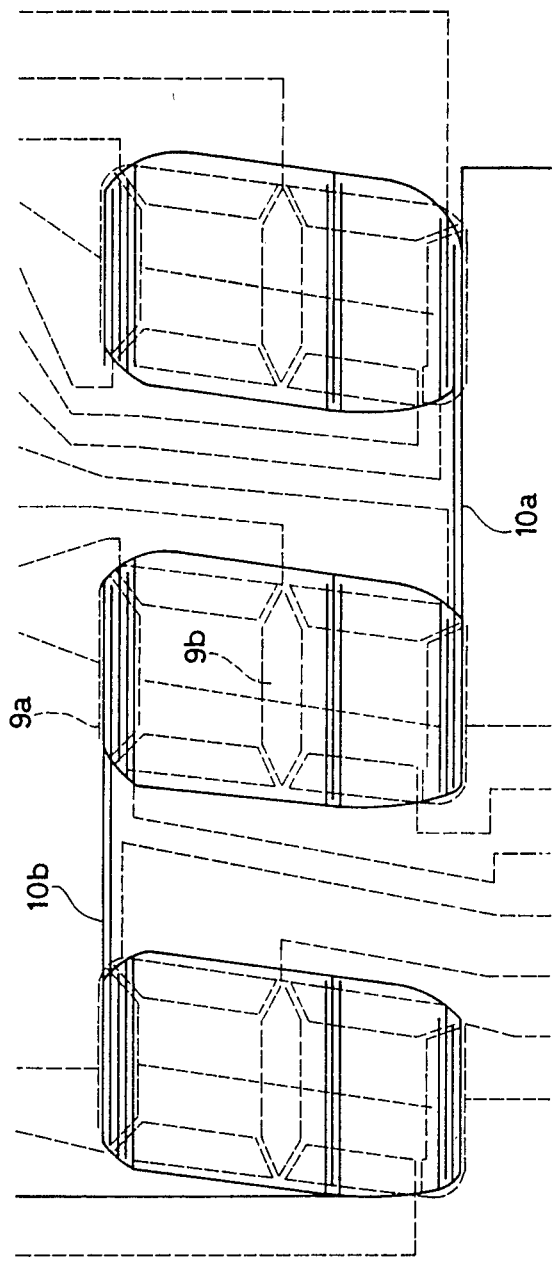

FIGS. 4 and 5 schematically illustrate common electrodes, segment electrodes, and wiring arrangements forming connections to lead electrodes of an LCD device capable of displaying numerals in three positions selectively in three colors. For clarity, the two interdigital common electrodes 10a, 10b and their wiring arrangements are shown by solid lines, while the segment electrodes 9 are shown as enclosed by dotted lines with their wiring arrangements shown by dotted lines. The interdigital structure of the common electrodes 10a, 10b is partly omitted from the illustration.

In these embodiments, the direction in which the striped colored layers extend is also horizontal in conformity with the interdigital configurations of the common electrodes 10a, 10b.

While embodiments of the invention have been described for two colors (N=2), numerals may be displayed in colors N>3 by increasing the number of common electrode divisions and the number of colors of the striped colored layers for colors N>2.

In the above described embodiments, the number of segments employed for one numeral position has been described as being seven. The present invention is however applicable to any number of segments, and multicolor characters can be displayed by increasing the number of segments for one figure digit.

With the arrangement of the present invention, as described above, an LCD device capable of displaying numerals with segments has N common electrode divisions of interdigital configurations and striped transparent colored layers of N colors formed on the interdigital configurations in conformity therewith for clearly displaying multicolor numerals with segments in (N+1) colors.

With the LCD device of the invention, furthermore, various multicolor displays are rendered possible by changing the colors of transparent coatings employed, and the desired arrangement can be achieved without increasing the number of external lead electrodes to a considerable extent.

We claim:

1. A liquid crystal display device, comprising:
   a plurality of similar segmented character units, each unit comprising a plurality of character electrodes and a plurality of electrical leads attached thereto, each said unit capable of representing a plurality of different characters;
   at least two sets of a plurality of common electrodes, extending in a first direction in parallel adjacent all said character units, the electrodes of different sets alternating in a second direction;
   at least two sets of differently colored transparent filters overlying respective sets of said common electrodes on the side of said character units;
   a continuous insulator layer covering said sets of filters on the side of said character units; and
   a liquid crystal layer disposed between said insulator layer and said character units.

2. A device as recited in claim 1, wherein said sets of common electrodes are interdigitated adjacent each said character unit.

3. The liquid crystal display device according to claim 1, wherein said striped transparent colored layers are spaced apart at a pitch within a viewing angle of 2 minutes.

* * * * *